July 17, 1928. 1,677,577
F. AMIOT
FRAME COMPONENT
Filed Jan. 28, 1924
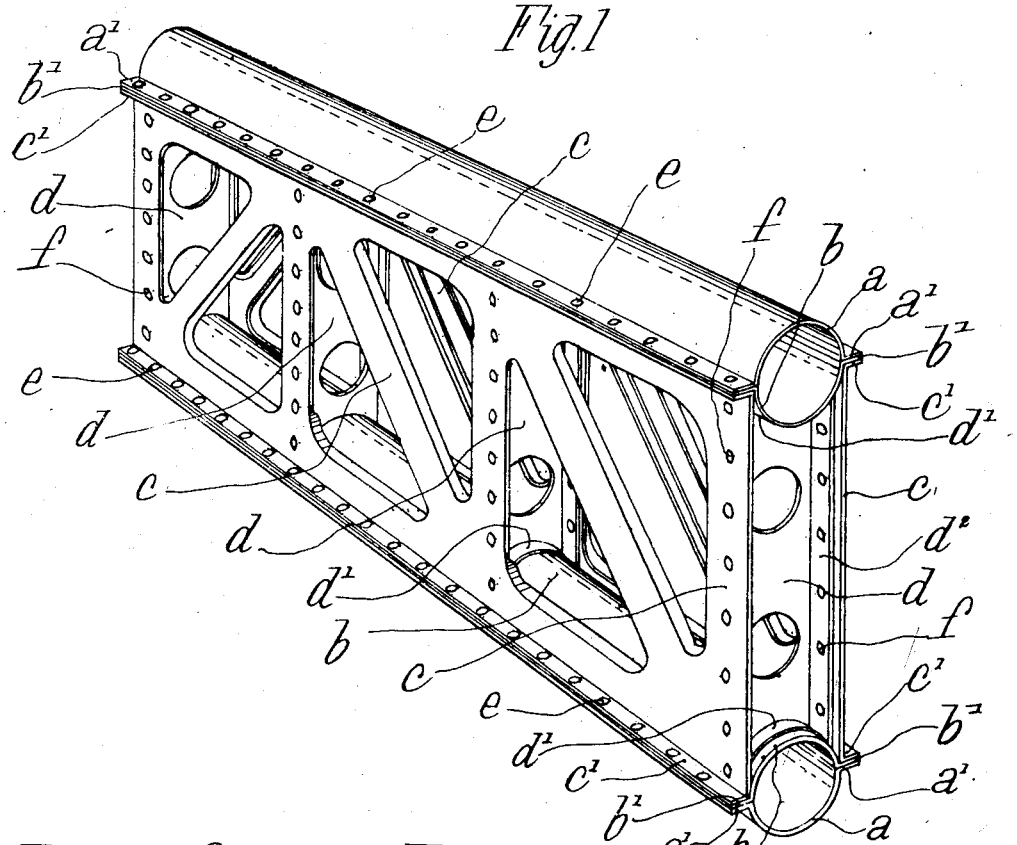

Patented July 17, 1928.

1,677,577

UNITED STATES PATENT OFFICE.

FELIX AMIOT, OF COLOMBES, FRANCE, ASSIGNOR TO "SOCIÉTÉ D'EMBOUTISSAGE ET DE CONSTRUCTIONS MÉCANIQUES," OF COLOMBES, SEINE, FRANCE, A FRENCH SOCIETY.

FRAME COMPONENT.

Application filed January 28, 1924, Serial No. 688,985, and in Belgium April 6, 1923.

This invention relates to frame components and refers more particularly although not exclusively to frame components or spars for use in the construction of aircraft, as that application appears to be the one of greatest importance.

The principal object of the invention is so to manufacture frame components or spars of the kind under consideration that the material from which they are constructed is utilized to the greatest advantage, so that it resists strains and local distortion of the parts.

According to the general principle of the invention, one at least of the elements from which the frame component is constructed is formed tubular.

The invention also refers to other constructional details, which are preferably utilized concurrently with the tubular element or elements, and which will be described more fully hereafter.

It further refers to certain embodiments and applications especially the application of its principles in the construction of fixed or movable devices, and more particularly aircraft.

In order that the invention may be more clearly understood, it will now be described with reference to the accompanying drawing, but it is to be observed that the description and drawing are given merely by way of example.

Fig. 1 is a perspective view of a portion of a spar for the main plane or wing of an aeroplane constructed according to the invention.

Figs. 2 and 3 are end views of two other forms of frame components or spars constructed according to the invention.

In constructing a spar for the wing of an aeroplane, the procedure is substantially as follows:—

$a$ and $b$ are trough-shaped elements provided with longitudinally extending outwardly turned edges or flanges $a^1$ and $b^1$, so that the elements can be fitted together, one upon the other, with the flanges in contact and so that in this position the inner cross section is substantially circular. Fig. 1 shows two pairs of members $a$, $b$, forming two cylindrical portions or tubes.

The before mentioned members are so arranged that the flanges are substantially perpendicular to a plane passing through the axes of the two cylindrical portions thus built up.

The axes may be parallel to one another or may converge according to the desired shape for the wing within which the spar is to be fitted.

A body portion is also provided connecting the tubular members. This comprises two cheeks or side plates $c$, with turned over edges or flanges $c^1$ adapted to fit against the edges or flanges $b^1$, on opposite sides of the tubes.

The cheeks may be of solid or continuous metal, or they may be open or of lattice work, and in this latter case they may take the form of a trellis as shown at Fig. 1, with the stays or diagonal elements so located that those in one direction withstand compression whilst others withstand tension.

Supporting members $d$ may also be provided adapted to interconnect at appropriate distances apart the tubular members and the cheeks. Each of the members $d$ may for this purpose be so shaped that the tubular elements $b$ have supporting them edges $d^1$ on the members $d$, whilst edges or flanges $d^2$ support the cheeks. The members $d$ may be of continuous metal or of open work like the cheeks.

After the parts have been fitted together as above described, they are attached to one another in any suitable manner, for instance as indicated in the drawing, where rivets $e$ are provided interconnecting the corresponding edges $a^1$, $b^1$ and $c^1$, whilst the edges $d^2$ of the members $d$ are connected to the corresponding cheeks by rivets $f$.

With the foregoing construction, a spar is obtained for an aeroplane in which any one of the tubular elements may be arranged to come at the upper portion. In some cases the parts which have the greatest strains to resist or which project, may have strengthening elements which may be constituted by tubes attached by tubular rivets: and in general the frame component or spar is adapted to resist the compression strains sustained by the upper portion of the structure.

In certain cases it is not necessary to form the lower element of the spar from a tube. In this instance and as shown at Fig. 2, the lower element may be formed from one or more bands or plates $g$ riveted to the lower edges $c^1$ of the cheeks and to the lower edges $d^1$ of the members $d$ which edges are then straight.

As regards the upper element, it is always formed tubular, but where the spar is to form a portion of a wing or plane of an aeroplane of relatively small height, so that relatively high compression strains would have to be resisted, the spar may be provided with a plurality of tubular elements of the same character as the single element above described.

A construction of this character is illustrated at Fig. 3, in the case of which the upper member comprises three tubular elements, whilst the lower member comprises only one. The construction is obvious from the drawing, so that it is unnecessary to give a detailed explanation. The central or middle portion is of a kind analogous to that described with reference to Fig. 1.

In place of the lower tubular member represented, some other construction may be adopted, such for instance as that illustrated at Fig. 2.

In the example illustrated at Fig. 3 on each side of the central portion are extending webs or buttresses $h$, with edges riveted to the upper tubular elements and to the cheeks.

By the foregoing means a built up spar is obtained particularly suitable for projecting planes or wings of aeroplanes which have a certain thickness. These planes furnished with spars of this description respond particularly well to practical requirements.

As has already been mentioned the invention is not limited to the particular constructional embodiments which have been described but include all modifications coming within a fair interpretation of the claims.

The upper and lower tubular elements of a spar may be connected in some other manner than that described.

What I claim as my invention and desire to secure by Letters Patent of the United States of America is:—

1. A frame component or spar, comprising opposing spaced cheeks, opposing elements each provided with a plurality of mating channels forming together tubular members and with companion flanges on opposite sides of said channels, the cheeks being secured to the flanges on opposite sides of one of said tubular members, at one end, a connecting member secured to the other ends of the cheeks, and webs or buttresses connected to the outer faces of said cheeks, to said connecting member, and to said channeled elements.

2. A frame component or spar, comprising an upper tubular member and a lower tubular member, each composed of like channeled elements fitted together and provided with companion flanges on opposite sides, said upper tubular member having associated therewith other tubular members on each side, cheeks located on opposite sides of the lower element of the upper member and the upper element of the lower member and connected to the flanges of said elements, and projecting webs or buttresses connected on the outside to said cheeks and upper and lower members.

In testimony whereof I hereunto affix my signature.

FELIX AMIOT.